United States Patent [19]

Repetto

[11] 3,974,691

[45] Aug. 17, 1976

[54] APPARATUS FOR MONITORING STEELMAKING

[75] Inventor: Eugenio Repetto, Rome, Italy

[73] Assignee: Centro Sperimentale Metallurgico S.p.A., Rome, Italy

[22] Filed: July 23, 1974

[21] Appl. No.: 491,149

[30] Foreign Application Priority Data

July 23, 1973 Italy .................................... 51588/73

[52] U.S. Cl. .......................... 73/190 R; 73/339 R
[51] Int. Cl.² ........................................ G01K 17/00
[58] Field of Search ............ 73/15 R, 190 R, 190 H, 73/339, 354, 359

[56] References Cited
UNITED STATES PATENTS

| 724,066 | 3/1903 | Whiting | 73/190 |
|---|---|---|---|
| 3,138,025 | 6/1964 | Fingerson | 73/190 |
| 3,167,956 | 2/1965 | Grey | 73/190 |
| 3,204,447 | 9/1965 | Krause et al. | 73/15 |
| 3,759,087 | 9/1973 | Iwoo et al. | 73/23 |

Primary Examiner—Herbert Goldstein
Attorney, Agent, or Firm—Young & Thompson

[57] ABSTRACT

A probe insertable in exhaust gases from steelmaking comprises a partitioned tube with an exposed forward portion that contains a pair of spaced thermometric elements. Heat transfer fluid moves across first one and then the other element, and the difference in recorded temperatures indicates the heat transferred to the fluid. Abrasive particles are intermittently projected against the exposed portion to clean off the deposits from the exhaust gases.

3 Claims, 2 Drawing Figures

U.S. Patent  Aug. 17, 1976  3,974,691
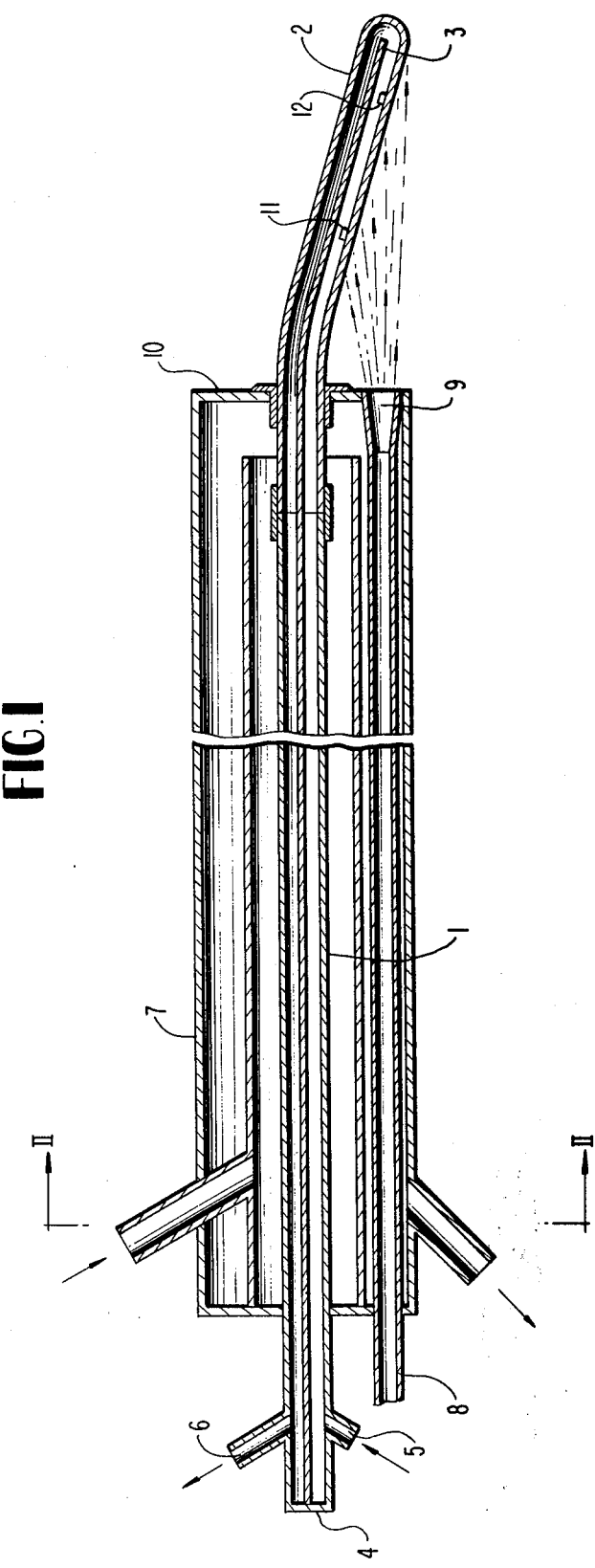
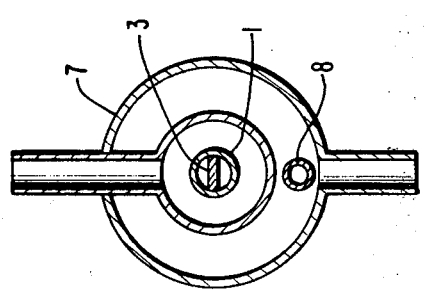

APPARATUS FOR MONITORING STEELMAKING

The present invention relates to apparatus for monitoring steelmaking processes, more particularly oxygen steelmaking processes.

As is well known, in oxygen steelmaking, the distribution of oxygen between the metallic bath and the slag, and thus the rate of decarburization and refining, and also the metallic yield and the rate of formation and the condition of the slag, vary to a considerable extent and in an unpredictable manner during the course of blowing oxygen onto or into the bath. For this reason, it is quite difficult to achieve reproducibility of the results from heat to heat; and so the carbon content of the steel can vary in an uncontrollable manner. Also, as the rate of decarburization varies, the quantity of heat leaving the converter also varies, with the result that the waste heat recovery equipment can be subjected to frequent and sharp variations of its thermal load, with consequent risk of breakage of superheater tubes and other damage.

It is thus evident that it is quite important to control and regulate the refining conditions; and to this end, it is indispensible that an accurate determination of the refining conditions should be possible at all times.

Many methods have been proposed for providing such a determination. One of these is the continuous sampling and analysis of exhaust gases from the converter, in order to determine how the quantity of carbon in those gases varies with time. However, this technique has the disadvantage that analysis is relatively slow and that the real conditions inside the converter can not be accurately deduced by this method.

Another method measures the temperature of the exhaust gases from the converter. This method has the advantage of having a very short response time, but the results are indicative only of the rate of reaction and not of the degree of completion of the reaction.

Still another method is the measurement of the variations in the length of the outer casing of the oxygen lance. However, this has the disadvantage that there is no unambiguous correlation between changes in the length of the lance and the progress of the refining reaction, since the iron oxide dust and splashed slag deposit on the lance and alter the heat conduction characteristics of the lance in an unpredictable and random manner.

Other monitoring methods are known, among them the measurement of converter noise level; but all of these have various disadvantages, the most important of which is that none of them alone is able to provide complete information on the progress of the refining process.

It is accordingly an object of the present invention to provide apparatus which is able to determine, during the refining process, quickly, simply and precisely the variation of factors directly connected with the rate of refining and decarburization of the bath, the information thus derived being usable in known ways for the regulation of the steelmaking process.

Another object of the present invention is the provision of such apparatus, which will be relatively easy and inexpensive to manufacture, install, operate, maintain and repair, and rugged and durable in use.

Briefly stated, the objects of the present invention are achieved by providing apparatus which is able to give information in an accurate and precise manner on the temperature, the gas flow rate, and the flame emissivity of the gases leaving a converter, thereby to give information pertinent to the progress of the decarburization and refining reactions. Such apparatus comprises an elongated probe which is bathed over a certain length by the fumes leaving the converter. Two thermometric elements are spaced apart along the probe, and a fluid of high heat capacity is passed first over one of the elements and then over the other. The heat received by the fluid while passing between the two elements will ensure that the two thermometric elements read differently; and this difference in reading provides a continuously monitorable parameter which, with the other known parameters such as speed and flow rate of the exhaust gas, speed and flow rate of the fluid of high heat capacity, and the coefficients of heat transfer, enables close and accurate monitoring and hence close and accurate control of the refining operation.

The buildup of ash and slag on the probe, however, will alter those coefficients of heat transfer; and so the probe has an obtusely angled end portion exposed to the exhaust gases, with means for blowing finely divided abrasive such as sand against this angled portion to keep it clean.

Other objects, features and advantages of the present invention will become apparent from a consideration of the following description, taken in connection with the accompanying drawing, in which:

FIG. 1 is a longitudinal cross-sectional view of apparatus according to the present invention; and FIG. 2 is a cross-sectional view taken on the line II—II of FIG. 1.

Referring now to the drawing in greater detail, there is shown apparatus according to the present invention, comprising a central tube 1 having an exposed forward portion 2 comprising a probe whose outer surface is to be directly contacted by exhaust gases from the refining process. Tube 1 is divided longitudinally by a medial divider 3 from its exposed portion 2 entirely to its rear or outer end 4. A fluid of high thermal capacity in liquid phase, e.g. water, high-density mineral oil, water-oil emulsion, or liquid metal such as sodium or lead, is introduced at inlet 5 into tube 1 and flows toward and through exposed portion 2 and back toward closed end 4 and exits through outlet 6. To this end, divider 3 is spaced from the end of exposed portion 2, so as to constitute a continuous path for the fluid.

Tube 1 is enclosed for the greater part of its length in a conventional jacket 7 with cooling water inlets and outlets and passages therealong, which accordingly need not be described in greater detail.

A conduit 8 extends lengthwise within jacket 7 and terminates in a nozzle 9. Means (not shown) are provided for blowing sand or other abrasive particles entrained in compressed air through tube 8 and out nozzle 9 against the exposed portion 2 of conduit 1, for the purpose of cleaning exposed portion 2 or iron oxide dust and slag and other contaminants that may be carried along in the exhaust gas and which would otherwise build up on exposed portion 2 and alter its heat transfer characteristics. To ensure the best contact between the abrasive and exposed portion 2, exposed portion 2 is bent at an obtuse angle to the rest of tube 1, for at least most of the distance from the closed forward end 10 of jacket 7 to the tip of exposed portion 2.

Thermometric elements 11 and 12 are disposed within exposed portion 2 spaced apart a predetermined distance along exposed portion 2 and on the side of exposed portion 2 which is directly abraded by the abrasive emitted from nozzle 9. The thermometric elements 11 and 12 are electrically connected in a conventional manner to continuous recording and display apparatus (not shown) so that the temperatures recorded thereby, and hence the differences in those temperatures, can be continuously monitored.

In operation, the fluid of high thermal capacity is fed through inlet 5 and along half of tube 1 on one side of divider 3 to exposed portion 2, where it bathes first the thermometric element 11 and then the thermometric element 12, and then returns on the other side of divider 3 to outlet 6. In passing from thermometric element 11 to element 12, the fluid is heated so that elements 11 and 12 give two different temperature readings. All the other parameters being known or readily determinable, these two temperatures and their relationship to each other and the variation of those temperatures and that relationship with time, give the remaining information needed for a complete and accurate monitoring of the refining and decarburization reactions that are taking place.

From time to time, abrasive can be blown through nozzle 9 to clean exposed portion 2. It is not intended to maintain a constant abrasive blast for this purpose, as of course a constant blast would alter the readings of elements 11 and 12.

The information thus derived is used in known ways for the control of refining processes. For example, it is possible to develop for a standard series of heats, with well defined charge composition and varying final carbon contents, a series of standard curves, each of which expresses the variation with time of the quantity of heat of the fumes leaving the converter for each type of heat. Subsequently, during the carrying out of refining processes, the actual curve of the operation is determined; and depending on the deviation of that actual curve from the standard curve, the operative parameters of the process will be adjusted, such as the rate of oxygen blowing and the distance between the lance head and the surface of the metallic bath, thereby to bring the actual curve into as close correspondence as possible with the standard curve. As indicated above, however, this technique is already known in the art and need not be further elucidated.

From a consideration of the foregoing disclosure, therefore, it will be evident that the initially recited objects of the present invention have been achieved.

Although the present invention has been described and illustrated in connection with a preferred embodiment, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:

1. A calorimetric probe adapted to be exposed directly for at least a part of its length to hot gases, said probe comprising an elongated tube having an elongated exposed portion, a cooling jacket surrounding said tube rearwardly of said exposed portion, said exposed portion extending lengthwise beyond said jacket, a pair of thermometric elements for the indication of temperature at two points spaced lengthwise of the probe, said thermometric elements being disposed inside the tube at said two spaced points, the outer side wall of said tube at said two points being disposed outside said cooling jacket and exposed to said hot gases, means for passing a fluid inside the tube in sequence over first one of said elements and then the other of said elements, said tube comprising a straight portion inside said cooling jacket, said exposed portion being obliquely angled relative to said straight portion, and means to project abrasive particles in a directional parallel to said straight portion to impinge on said oblique exposed portion.

2. A probe as claimed in claim 1, said tube having a divider therein that bisects said tube into two parallel longitudinally extending portions, said divider terminating short of the free end of said exposed portion of said tube to define a return passage for said fluid.

3. A probe as claimed in claim 1, said projecting means comprising a straight tube extending through said cooling jacket.

* * * * *